United States Patent [19]

Staby

[11] 3,899,732

[45] Aug. 12, 1975

[54] METHOD AND APPARATUS FOR MONITORING BATTERY ENERGY LEVEL

[75] Inventor: Paul A. Staby, Lakewood, Colo.

[73] Assignee: Statitrol Corporation, Lakewood, Colo.

[22] Filed: Aug. 16, 1973

[21] Appl. No.: 388,975

[52] U.S. Cl. ............. 324/29.5; 340/237 S; 340/249
[51] Int. Cl. ...................... G01n 27/42; G08b 21/00
[58] Field of Search ........ 324/29.5; 340/237 S, 249, 340/248 B, 248 D

[56] References Cited
UNITED STATES PATENTS

| | | | |
|---|---|---|---|
| 3,356,936 | 12/1967 | Smith | 324/29.5 |
| 3,529,230 | 9/1970 | Tedd | 340/249 X |
| 3,594,751 | 7/1971 | Ogden | 340/249 X |

Primary Examiner—Alfred E. Smith
Assistant Examiner—Rolf Hille
Attorney, Agent, or Firm—Max L. Wymore

[57] ABSTRACT

A fire detection apparatus operates to self-monitor the energy level of a cell or battery powering it by periodically comparing a first signal, which is a function of the unloaded battery output voltage, with a second signal, which is a function of the battery output voltage when loaded, to generate a difference signal. The difference signal is characterized by only exceeding a predetermined magnitude whenever the energy stored in the battery is below a selected energy level and is used to indicate impending battery failure by driving a different alarm or the same alarm in a manner noticeably different from the alarm signal generated in response to the detection of a fire.

15 Claims, 5 Drawing Figures

PATENTED AUG 12 1975 3,899,732
SHEET 1
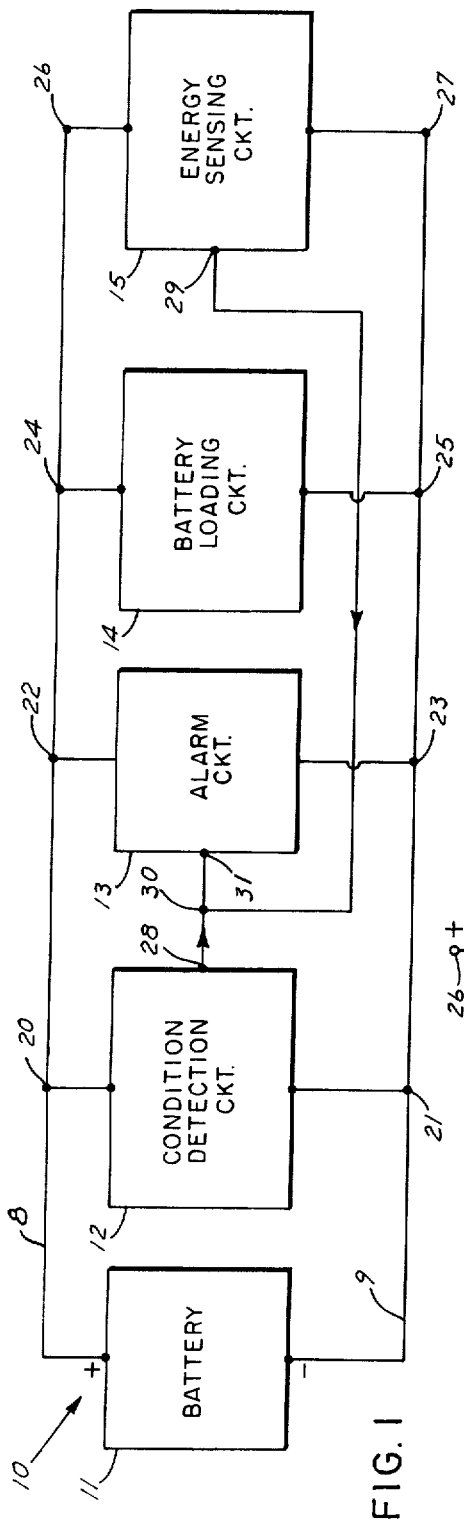
FIG. 1
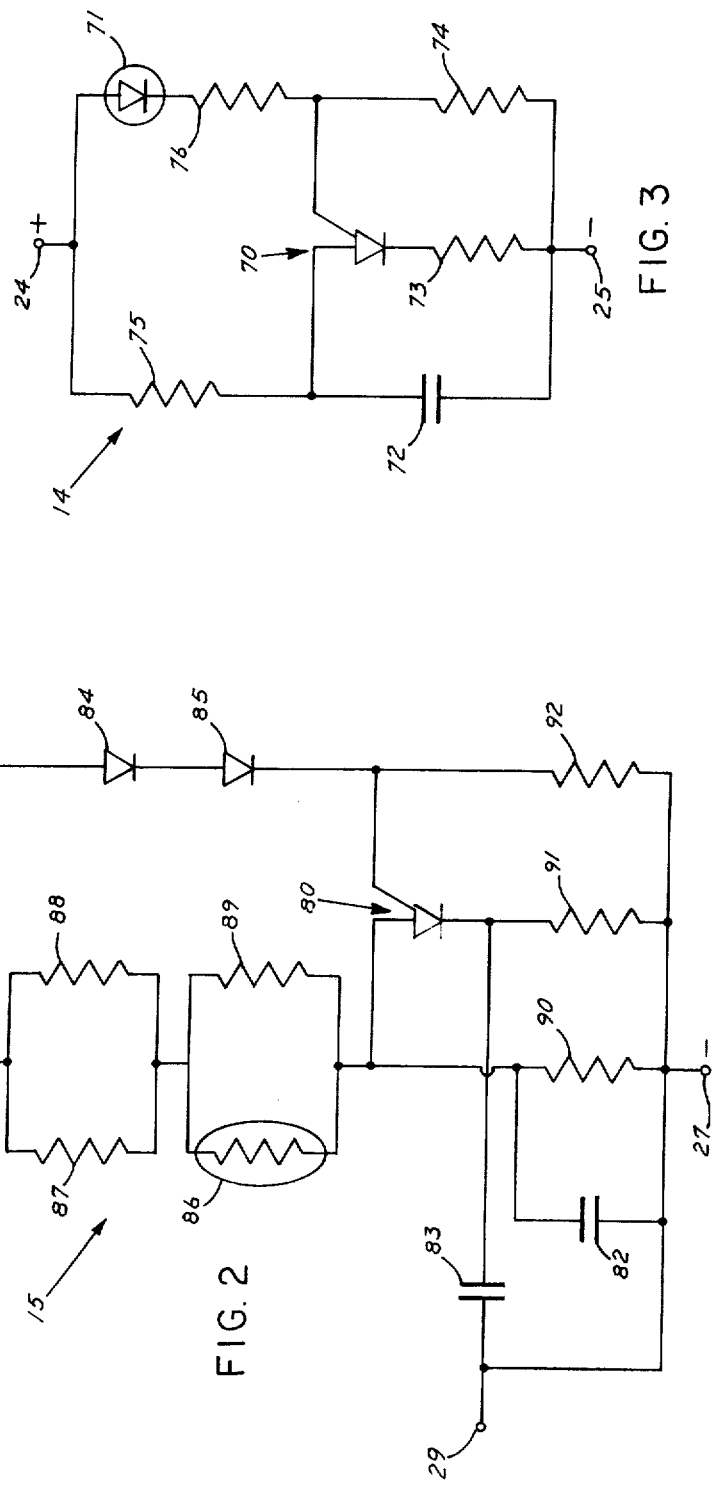
FIG. 3
FIG. 2

METHOD AND APPARATUS FOR MONITORING BATTERY ENERGY LEVEL

The present invention relates to a self-monitoring cell or battery operated apparatus and its method of monitoring the energy level of the battery powering it.

Heretofore, battery powered equipment has generally been considered unreliable. This unreliability problem is primarily due to variations between individual batteries which cause the lengths of the useful lives of different batteries to vary considerably one from the other. As a consequence, it is difficult to accurately predict when the batteries should be replaced. Accordingly, it has been considered unsafe to power alarms, such as fire detectors, by batteries.

Battery failure is caused by a decrease of the energy in a battery below a level sufficient to properly operate the equipment which it powers. This energy decrease is generally evidenced by the combination of decreased battery output voltage and increased battery internal resistance. An increase in battery internal resistance tends to limit the battery output current and hence the power output of the battery. Likewise, a decrease in battery output voltage tends to limit its power output.

Circuits have been devised to detect battery failure evidenced only by low battery output voltage or by low current capability. The utility of such circuits, however, has generally been limited since, as above mentioned, most battery failures are due to a decrease in battery output voltage in combination with an increase in battery internal resistance rather than a more pronounced change in only one of these parameters.

It is, accordingly, an object of the present invention to provide an improved dependable self-monitoring battery operated apparatus or circuit capable of warning of impending battery failure caused by a decrease in battery output voltage in combination with an increase in battery internal resistance as well as caused by a more pronounced change in only one of these parameters.

It is a further object of the present invention to provide an improved method and circuit for monitoring the energy level of a battery and determining if the energy in the battery exceeds a selected level.

In accomplishing these and other objects, there is provided in accordance with the present invention a self-monitoring battery operated fire detection apparatus which includes an alarm. The circuit operates to self-monitor the energy level of the battery powering it by periodically comparing a first signal which is a function of the unloaded battery output voltage with a second signal which is a function of the battery output voltage when loaded. A difference signal is generated from the first and second signals which is characterized by only exceeding a predetermined magnitude whenever the energy stored in the battery is below a selected energy level. The difference signal is used to drive the alarm to indicate impending battery failure whenever it exceeds the predetermined magnitude and is operable to drive either an alarm different from the alarm for indicating a condition sensed or the same alarm in a manner noticeably different from the alarm signal generated in response to the detection of a condition sensed, such as a fire.

Additional objects of the present invention reside in the specific construction and method of operation of the exemplary self-monitoring battery operated apparatus hereinafter particularly described in the specification and shown in the several drawings.

FIG. 1 is a block diagram of a self-monitoring battery operated apparatus in accordance with the present invention which is designed for detecting a selected condition;

FIG. 2 is a circuit diagram of the energy sensing circuit of FIG. 1;

FIG. 3 is a circuit diagram of the battery loading circuit of FIG. 1;

Figure 4:
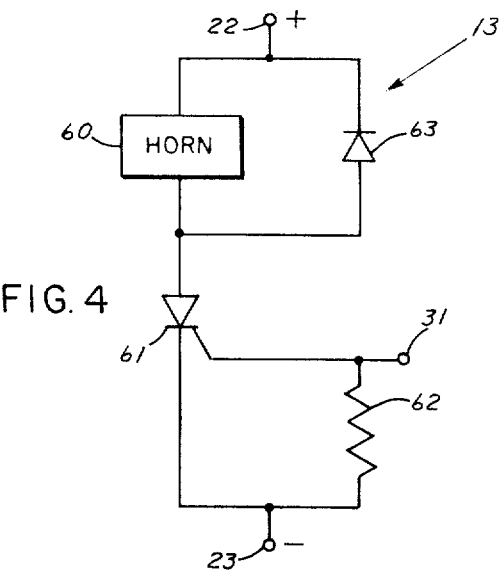
FIG. 4 is a circuit diagram of the alarm circuit of FIG. 1.

Referring to the drawings in more detail, there is shown in FIG. 1 a self-monitoring condition detection apparatus generally identified by the numeral 10. The apparatus 10 is made up of an electrical storage battery power source 11, a condition detection circuit 12, an alarm circuit 13, a battery loading circuit 14, and an energy sensing circuit 15.

The battery power source 11 has positive and negative terminals designated by plus and minus, respectively, and may be made up of one or more individual storage cells or batteries appropriately connected in series or parallel. The circuits 12, 13, 14 and 15 have, respectively, power receiving terminals 20, 21; 22, 23; 24, 25; and 26, 27. Additionally, the condition detection circuit 12 and energy sensing circuit 15 have output terminals 28 and 29, respectively, commonly connected at circuit point 30 to input terminal 31 of the alarm circuit 13. The power input terminals 20, 22, 24 and 26 are connected to the positive terminal of the battery 11 by an electrical lead 8 while the terminals 21, 23, 25 and 27 are connected to the negative battery terminal by an electrical lead 9.

Figure 5:
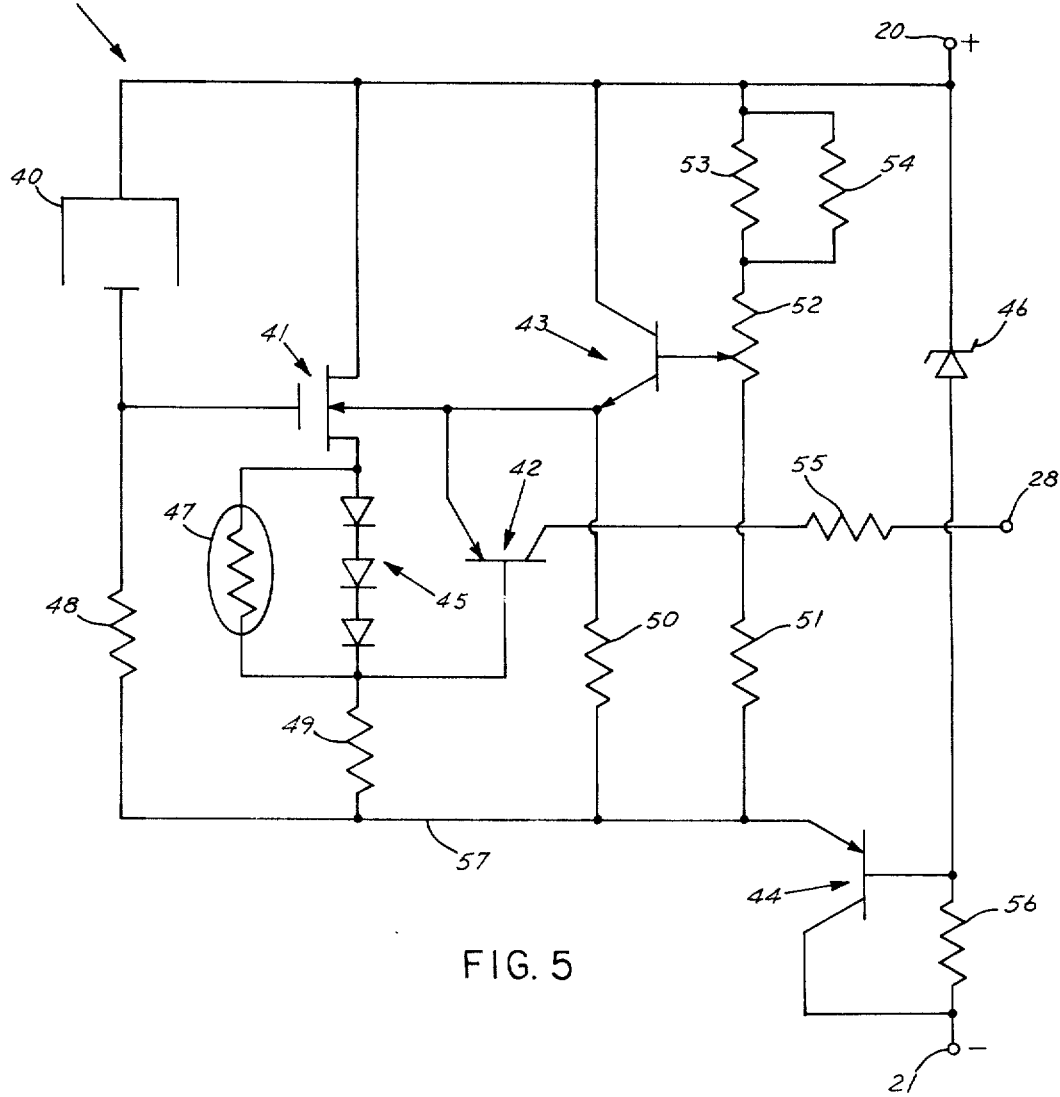
FIG. 5 is a circuit diagram of the condition detection circuit of FIG. 1 which is designed to detect fire by sensing the presence of smoke.

Referring to FIG. 5, an exemplary form of battery powered condition detection circuit 12 is there shown which is designed to indicate fire by detecting smoke in the atmosphere. The circuit 12 is made up of an ion chamber 40, a field effect transistor (FET) 41, transistors 42, 43 and 44, diodes 45, Zener diode 46, thermistor 47, and resistors 48–56.

In the circuit 12, the transistor 44, resistor 56 and Zener diode 46 form a voltage regulator which regulates the DC power supplied to the negative side 57 of the circuit 12. The regulated voltage supplied to the circuit 12 by the battery 11 may be, for example, 6 volts. The resistors 51–54 form a voltage divider which supplies an appropriate bias voltage to the base electrode of the transistor 43. The transistor 43 is connected as an emitter follower and sets the voltage supplied to the emitter electrode of the voltage switch formed by transistor 42.

In operation of the circuit 12, the ion chamber 40 conducts sufficiently when no smoke is present therein to bias the FET 41 into a conductive state. With the FET 41 biased on, the transistor 42 is reversed biased so that no output signal is generated on the output terminal 28 to energize the alarm 13. When a fire starts, combustion products and/or smoke in the atmosphere enters the ion chamber 40 reducing the conductivity of the atmosphere therein. As a result, the current flow through the chamber 40 and resistor 48 decreases sufficiently to bias the FET 41 off into a nonconductive state. Thereby, the transistor switch 42 turns on to transmit the voltage on the collector electrode to output terminal 28 as an alarm actuating signal. The alarm 13 as a result is actuated to indicate the fire.

The alarm circuit 13 as shown in FIG. 4 is made up of a horn 60, silicon controlled rectifier (SCR) 61, bias resistor 62 and diode 63. The horn 60 is of a conventional type having contacts which open when current flows therethrough, i.e., when the anode-cathode current path of the SCR 61 conducts, but which automatically then reclose. With the above mentioned alarm actuating signal from the collector electrode of the transistor 42 on the detection circuit output teminal 28, the SCR 61 is biased into conduction. Consequently, the alarm circuit 13 will energize alarm signal means 60 indicating a fire by producing a rapid series of blasts of the horn 60 sounding as a continuous tone as long as the detection circuit output signal is generated. The blasts of the horn 60 are generated on each closure of the horn contacts. It will be appreciated that the alarm signal means may conveniently be a visual or other signal means and may comprise one signal means for the condition sensed and another signal means for indicating battery condition.

The circuit for monitoring the energy level of the battery 11 is made up of the battery loading and energy sensing circuits 14 and 15.

An exemplary battery loading circuit 14 is shown in FIG. 3 and is made up of a programable unijunction transistor 70 of equivalent, light emitting diode 71, capacitor 72 and resistors 73-76. The term programable unijunction transistor or equivalent is intended to mean a programable unijunction transistor known in the art as a PUT or a pair of complimentary transistors connected to function as the equivalent of a programable unijunction transistor. The battery loading circuit 14 operates as a free running oscillator at a suitable frequency, such as twelve cycles per minute. The capacitor 72 and resistor 75 are connected as an integrator and aupply an integrated output voltage signal to the anode electrode of the unijunction 70. The gate electrode of the unijunction 70 is supplied with a bias voltage provided by the voltage divider formed by the light emitting diode 71 and resistors 76, 74. The cathode electrode of the unijunction 71 is connected through the resistor 73 to the negative voltage supply terminal 25.

In operation of the loading circuit 14, the unijunction 70 periodically conducts or latches in a conductive state whenever the capacitor 72 has charged to a voltage sufficient to exceed the intrinsic stand off voltage between the anode and gate electrodes of the unijunction 70. This stand off voltage may be, for example, 0.6 volts. Upon the latching of the unijunction 70 in a conductive state, the capacitor 72 is discharged and the unijunction gate electrode is pulled to the potential on the negative DC voltage supply terminal 25. Thereby, the battery 11 is periodically loaded and momentarily subjected to an increased discharge current.

It is noted that enough current must be supplied to the unijunction gate electrode through the resistor 76 to unlatch the unijunction 70 from its conductive state so that the oscillator will recycle. Generally, this would require the voltage divider made up of the resistors 74, 76 to draw a relatively large current, such as 5 to 10 milliamperes. Such a large current drain, however, would be unsuitable for long operation of the battery 11. By placing the light emitting diode 71 in series with the resistor 70, a voltage drop of approximately 1 volt is obtained at low currents, such as 10 microamperes. As a result, the unijunction 70 operates and unlatches properly with the light emitting diode 71 in the circuit while only drawing an average current of less than 50 and on the order of 20 microamperes from the battery 11. Further, the periodic flashing of the light emitting diode 71 provides a visual indication that the battery monitoring circuit is properly operating.

Referring to FIG. 2, an exemplary energy sensing circuit 15 is there shown. The circuit 15 is made up of a programable unijunction transistor 80 or equivalent, capacitors 82-83, diodes 84-85, a thermistor 86 and resistors 87-92.

The unijunction transistor 80 is biased such that it does not conduct under quiescent conditions. The diodes 84-85 and the resistor 92 provide the bias for the gate electrode of the unijunction transistor 80. The thermistor 86 and resistors 87-90 provide a temperature compensated biasing circuit for the anode electrode of the unijunction transistor 80. The cathode electrode of the unijunction transistor 80 is connected through the resistor 91 to the negative DC voltage supply terminal 27.

Under quiescent conditions the anode voltage of the unijunction transistor 80 is set to be almost sufficient to cause the unijunction transistor 80 to conduct. Each time the battery 11 is loaded by the conduction of the unijunction transistor 70, the voltage applied by the battery 11 across the terminals 26, 27 drops slightly. This slight drop in battery output voltage is due to voltage drop within the loaded battery across its internal resistance and may, for example, be in the neighborhood of several hundredths of a volt.

This drop in output voltage of the battery 11 appears fully on the gate electrode of the unijunction transistor 80 being directly transmitted thereto by the diodes 84-85. The instantaneous voltage on the anode of the unijunction transistor 80, however, does not change since the capacitor 82 substantially retains its charge during the loading of the battery 11. If the gate voltage of the unijunction transistor 80 falls when the battery 11 is loaded low enough relative to its anode voltage, the unijunction transistor 80 conducts and a short duration output pulse indicating a weak battery is transmitted through the capacitor 83 to the input terminal 31 of the alarm 13. It is here noted that the circuit components and bias voltages are designed so that the difference voltage signal between the unijunction transistor 80 anode and gate electrodes will only exceed the selected value necessary to cause the unijunction to conduct whenever the energy level of the battery 11 has fallen below a preselected level. Once the unijunction transistor 80 conducts, sufficient current to reset it to its quiescent nonconductive condition is supplied through the diodes 84-85 to the unijunction gate electrode.

In response to the output signal from the circuit 15, the SCR 61 in the alarm 13 conducts. With the SCR 61 conductive, the contacts of the horn 60 open as the horn starts to sound. The current of the SCR 61 consequently goes to zero and the SCR 61 turns off since the output signal from the circuit 15 is no longer being applied to the SCR gate electrode. Thus, in response to an output pulse from the circuit 15, the horn 60 will "click" on and off instead of generating a loud blast. Accordingly, a signal which sounds entirely different from the fire alarm signal is generated to indicate that the battery 11 is weak and should be changed. It will be appreciated that the weak battery signal appearing on lead 29 of the energy sensing circuit 15 could be applied to a different alarm circuit from that to which the condition detection circuit is applied to distinguish between which circuit is being energized.

The voltage difference between the anode and gate electrodes of the unijunction transistor 80 provides a measure of the energy remaining in the battery 11 for the following reasons. As energy in the battery is removed, its output voltage under its normal load condition gradually decreases, and as the supply voltage decreases unijunction transistor 70 loads the battery less. This decrease in output voltage appears across the voltage divider formed by the resistors 86–90 and is applied by the resistor 90, capacitor 82 to the unijunction anode as a first voltage signal having a magnitude equal to a selected portion of the output voltage less than 100 percent of the voltage across divider 86–90. The first voltage signal will not change much as the battery is loaded by unijunction transistor 70 because capacitor 82 retains its charge. The second voltage signal appearing on the unijunction gate electrode, however, is equal to the instantaneous output voltage of the battery 11, under load and no load conditions, less a predetermined voltage drop. This predetermined substantially constant voltage drop is due to the fact that the voltage drop across the diode 84, 85 is constant and not dependent on current flow therethrough. It will be noted that the voltage drop across the diodes 84, 85 will remain substantially constant such that as the voltage from the battery decreases, the sensitivity of the energy level detection is increased.

As a consequence of the above described circuit construction, the voltage difference between the unijunction transistor 80 anode and gate electrodes gradually increases as the battery output voltage decreases since the full battery voltage drop appears on the gate electrode while only a percent of it appears on the anode electrode. As a result, as the output voltage of the battery 11 decreases with removal of energy therefrom, a lesser voltage drop due to battery internal resistance will be necessary to cause the unijunction transistor 80 to conduct.

Accordingly, there has been provided an improved circuit arrangement and method capable of determining if the energy remaining in a battery exceeds a selected level and warning of impending battery failure caused by a decrease in battery output voltage in combination with an increase in battery internal resistance as well as caused by a more pronounced change in only one of these parameters. Further, the circuit arrangement has the advantage of being operated by low currents so as to constitute a very low energy drain on the battery being monitored.

What is claimed is:

1. Battery operated detection apparatus comprising:
   first and second electrical lead means for connection, respectively, to the positive and negative terminals of a battery power source;
   battery powered means for sensing a selected condition and generating a first electrical output signal representative of said condition, said sensing means being connected between said electrical lead means to receive power therefrom whereby to be powered by the battery power source connected thereto;
   battery powered alarm means connected between said first and second electrical leads to receive power therefrom whereby to be powered by the battery power source connected thereto, said alarm means being connected to said sensing means to receive said first electrical output signal and being operable to generate an output signal corresponding thereto;
   means connected between said first and second electrical leads for periodically loading the battery power source connected thereto to subject it to momentary increased discharge current;
   means for generating a first voltage signal having a magnitude equal to a selected proportion less than 100 percent of the output voltage of the battery power source prior to said loading;
   means for generating a second voltage signal having a magnitude less than said first voltage signal and equal to the output voltage of the battery power source when loaded less a predetermined voltage drop; and,
   means for comparing said first and second voltage signals and generating a second electrical output whenever their difference exceeds a predetermined magnitude, said difference only exceeding a predetermined magnitude whenever the energy stored in the battery power source is below a selected energy level, and alarm means being connected to receive said second output signal and being operable to generate an output signal corresponding thereto.

2. The invention defined in claim 1 wherein said alarm means is said battery powered alarm means.

3. The invention defined in claim 1 wherein said selected condition sensed by said sensing means is the conductivity of the atmosphere whereby fire may be detected by the presence of smoke and/or combustion products in the atmosphere.

4. The invention defined in claim 3 wherein said oscillator employs a programable unijunction transistor or equivalent.

5. The invention defined in claim 4 wherein a light emitting diode is employed to bias said oscillator into recycling so as to minimize the energy drain on the battery power source.

6. The invention defined in claim 1 wherein said means for generating said first voltage signal is a voltage divider circuit connected between said first and second electrical lead means.

7. The invention defined in claim 1 wherein said means for generating said second voltage signal is at least one diode connected in series with a resistor between said first and second electrical lead means, said second voltage signal being generated at the point of connection of said diode with said resistor.

8. The invention defined in claim 1 wherein said means for comparing said first and second voltage signals and generating said second output signal is a programable unijunction transistor means or equivalent.

9. The invention defined in claim 1 wherein:
   said first output signal generated by said sensing means is generated as long as said selected condition is sensed;
   said second output signal generated by said means for comparing said first and second voltage signals is a pulse of short duration; and, said alarm means is responsive to provide a different alarm signal.

10. The invention defined in claim 1 wherein the means for periodically loading the battery power source draws less than 50 microamperes current therefrom.

11. The invention defined in claim 9 wherein said alarm means includes a silicon controlled rectifier and a sound generator, said silicon controlled rectifier having its anode-cathode current path connected in series with said sound generator and its gate electrode connected to receive said first and second output signals, said sound generator having automatically reclosing contacts which open when electrical current flows therethrough whereby a series of blasts of said generator are generated in response to said first output signal and said sound generator starts to turn on but immediately clicks off in response to said second output signal so as to generate an audible click.

12. A circuit arrangement for determining whether the energy in an electrical storage cell or battery exceeds a selected level, comprising:
    means connected to the terminals of said battery for generating a first signal having a magnitude equal to a selected proportion less than 100 percent of the unloaded output voltage of said battery;
    means connected to the terminals of said battery for periodically loading said battery to subject it to a momentary increased discharge current;
    means connected to the terminals of said battery for generating a second signal having a magnitude less than said first signal and equal to the loaded output voltage of said battery less a predetermined value; and,
    means for comparing said first and second signals and generating an output signal whenever their difference exceeds a predetermined magnitude, said difference only exceeding a predetermined magnitude whenever the energy stored in said battery is below said selected energy level.

13. A method for determining whether the energy in an electrical storage battery exceeds a selected level comprising the steps of:
    sensing the output voltage of the battery under a selected load condition and generating a first voltage signal having a magnitude equal to a selected proportion thereof less than 100 percent;
    periodically loading the battery to subject it to momentary increased discharge current and simultaneously sensing its output voltage;
    generating a second voltage signal having a magnitude less than said first voltage signal and equal to the output voltage of the loaded battery less a predetermined voltage drop; and,
    generating a third voltage signal equal to the difference between said first and second voltage signals, said third voltage signal only exceeding a predetermined magnitude whenever the energy stored in the battery is below a selected energy level.

14. The invention defined in claim 1 wherein the means for periodically loading the battery power source draws less than 50 microamperes current therefrom.

15. Battery operated detection apparatus comprising:
    first and second electrical lead means for connection, respectively, to the positive and negative terminals of a battery power source;
    battery powered means for sensing a selected condition and generating a first electrical output signal representative of said condition, said sensing means being connected between said electrical lead means to receive power therefrom whereby to be powered by the battery power source connected thereto;
    battery powered alarm means connected between said first and second electrical leads to receive power therefrom whereby to be powered by the battery power source connected thereto, said alarm means being connected to said sensing means to receive said first electrical output signal and being operable to generate an output signal corresponding thereto;
    means connected between said first and second electrical leads for periodically loading the battery power source connected thereto to subject it to momentary increased discharge current, said means for periodically loading the battery power source being a free running oscillator;
    means for generating a first voltage signal having a magnitude equal to a selected proportion less than 100 percent of the output voltage of the battery power source prior to said loading;
    means for generating a second voltage signal having a magnitude less than said first voltage signal and equal to the output voltage of the battery power source when loaded less a predetermined voltage drop; and,
    means for comparing said first and second voltage signals and generating a second electrical output whenever their difference exceeds a predetermined magnitude, said difference only exceeding a predetermined magnitude whenever the energy stored in the battery power source is below a selected energy level, and alarm means being connected to receive said second output signal and being operable to generate an output signal corresponding thereto.

* * * * *